Oct. 25, 1938.  C. H. MANZLER  2,134,138
MEMORANDUM BOOK
Filed March 27, 1937  2 Sheets-Sheet 1
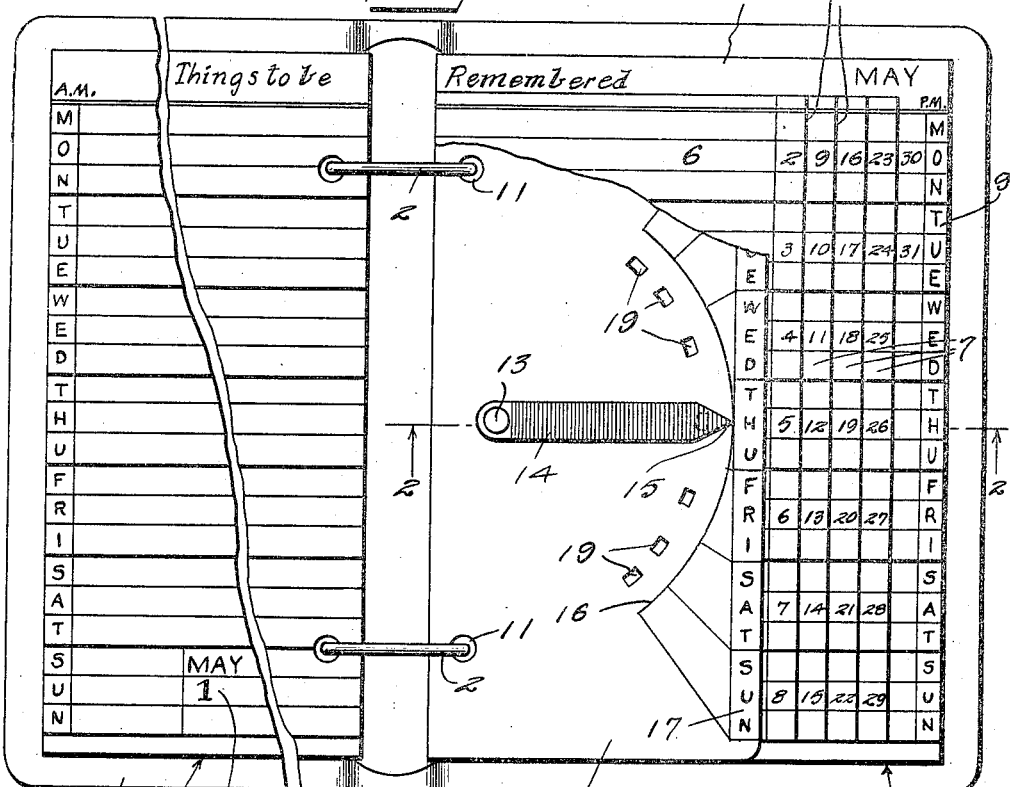
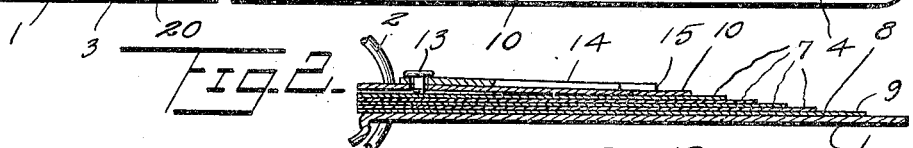
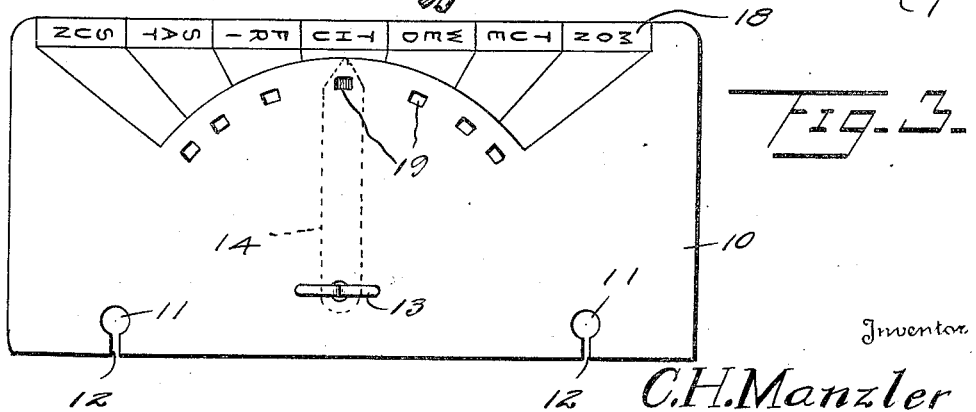
Inventor
C. H. Manzler
By Watson E. Coleman
Attorney Oct. 25, 1938.   C. H. MANZLER   2,134,138
MEMORANDUM BOOK
Filed March 27, 1937   2 Sheets-Sheet 2
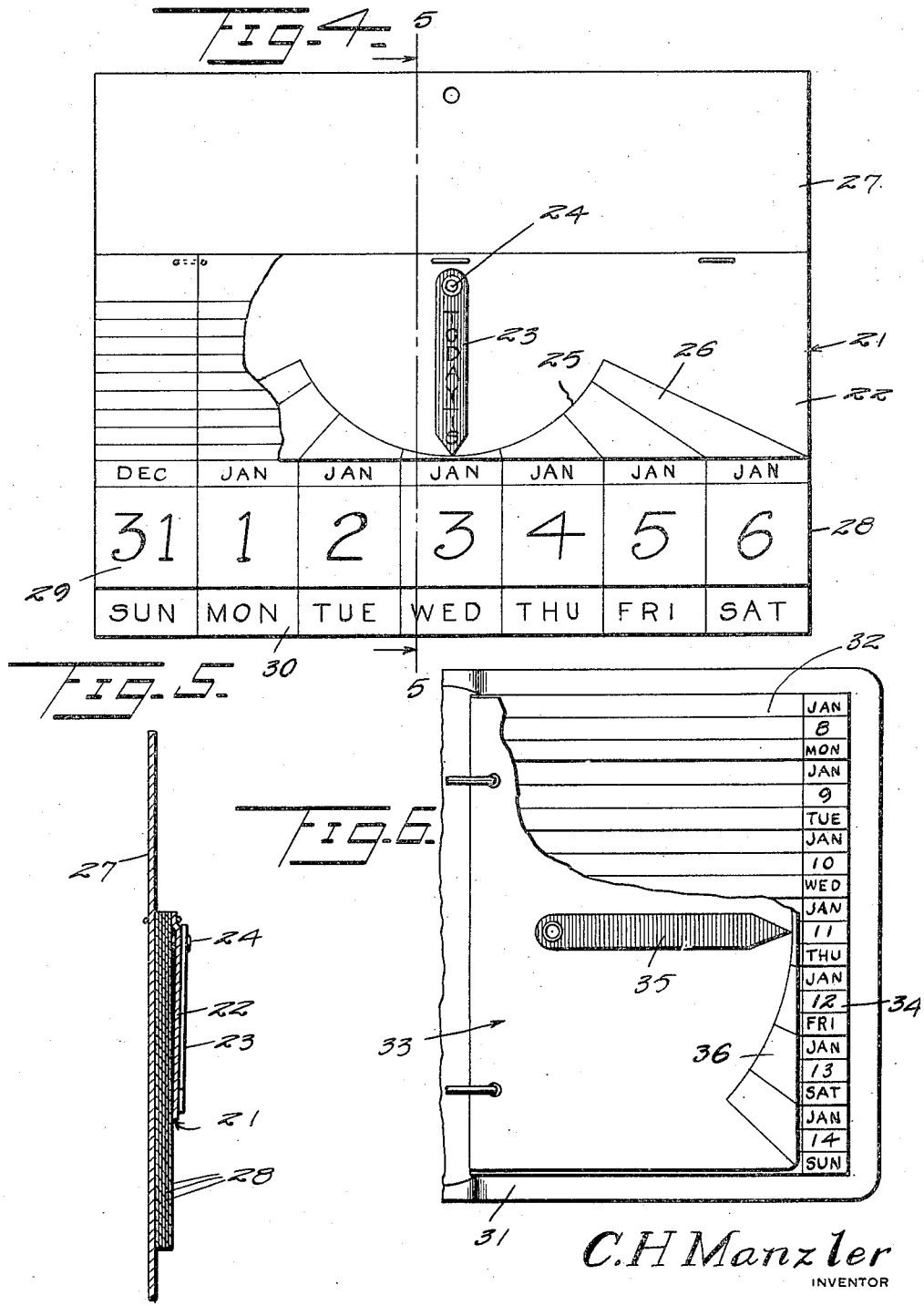
C. H. Manzler
INVENTOR
BY Watson E. Coleman ATTORNEY Patented Oct. 25, 1938

2,134,138

UNITED STATES PATENT OFFICE 2,134,138

MEMORANDUM BOOK

Clarence H. Manzler, Rochester, N. Y.

Application March 27, 1937, Serial No. 133,442

7 Claims. (Cl. 281—1)

This invention relates to improvements in memorandum books and pertains particularly to a memorandum book which is so constructed as to provide a calendar in association with the book leaves.

The present invention has for its primary object to provide a novel combination memorandum and calendar in which the memorandum is made up of groups of pages so related as to provide visible marginal portions for the notation, beside memorandum areas, of the days of the month which the group of pages represents.

Another object of the invention is to provide in combination with a memorandum book having the pages thereof assembled in groups in the manner described or any book having a column or row of dates adjacent to memorandum areas, a novel marking or indicating device for use in association with the pages, by means of which the day of the week or month may be indicated so as to provide a constant indication of the current day.

A still further object of the invention is to provide in combination with a novelly arranged month representing group of book leaves, a marker and indicator having the days of the week noted thereon for use in association with memorandum areas on the group of leaves whereby when the exposed marginal areas of the leaves are provided with date figures, the marker will correlate the date figures with the days of the month so as to provide a perpetual calendar.

A still further object of the invention is to provide a novel indicator means for use in association with a calendar sheet, which may form one of a number of leaves of a book or a sheet of a wall calendar pad, whereby a visual indication will be given of the calendar month, the day of the month, and the day of the week.

The invention will be best understood from a consideration of the following detailed description taken in connection with the accompanying drawings forming part of this specification, with the understanding, however, that the invention is not confined to any strict conformity with the showing of the drawings but may be changed or modified so long as such changes or modifications mark no material departure from the salient features of the invention as expressed in the appended claims.

In the drawings:—

Figure 1 is a view in plan of an opened loose leaf book showing the face of one group of pages representing one month and the back of the last page of a group representing the preceding month, the view also showing the improved marker.

Figure 2 is a sectional view taken on the line 2—2 of Figure 1.

Figure 3 is a view in plan of the obverse face of the marker shown in Figure 1.

Figure 4 is a view of the indicator device used in association with a wall calendar or calendar pad, wherein each sheet has exposed the days of a single week and bears the name of the current month and is ruled so that each day of the week coincides with the name of a week day printed upon the bottom or back sheet of a calendar.

Figure 5 is a sectional view taken on the line 5—5 of Figure 4.

Figure 6 is a view in plan of a portion of a loose leaf book showing the use of a marker of the type shown in Figure 1, which is designed to be used in a book where all of the leaves are of the same width and each has an exposed marginal edge portion in which names of the days of the week and the current month with the days of the month are printed.

Referring more particularly to the drawings, wherein like numerals of reference indicate corresponding parts throughout the several views, the numeral 1 indicates generally the back of a loose leaf book, having the usual leaf retaining rings 2.

The numerals 3 and 4 represent groups of pages constructed in accordance with the present invention and retained in the book by the rings. Each of these groups is made up of the individual sheets or pages 5 and these pages are in turn transversely ruled to provide memorandum or notation areas 6.

As illustrated, the back or last page of each of the groups is of greater length and width than the other pages and the remaining pages are of gradually decreasing width so as to provide the exposed longitudinal areas 7 in each of which is placed a figure representing a day of the month. The last page of each group, which is indicated by the numeral 8, has its longitudinal marginal portion which is exposed beyond the other pages, of greater width than the exposed areas 7 of the pages 5 so as to provide an additional exposed marginal column, as indicated at 9, for the insertion of the days of the month, each day notation being disposed in a memorandum area 6. At the top of the last page 8 of each group, the exposed portion may have the name of a month inserted, as illustrated. There will be, therefore, in each book, twelve groups of pages, each group being made up of a back or last page 8 and four associate pages each of gradually decreasing width, as illustrated at the right hand side of Figure 1.

As shown in Figure 1, the back of the last page of each group is also provided adjacent its longitudinal edge, with the names of the days of the week, corresponding with the names upon the opposite side.

Associated with the groups of pages, is a place marker and day indicator which comprises a board or card 10 of paper or any other suitable material, of sufficient thickness to give it substantial form. This marker and indicator is provided with ring apertures 11 from which extend slots 12 to the adjacent edge of the marker so as to facilitate the ready insertion of the marker or its removal, between a selected pair of pages. The marker has fixed at its transverse center and adjacent the back edge, a suitable pivot which may be in the form of a paper fastener or a rivet 13, to which is pivotally attached at one end an indicating arrow 14, the point 15 of which is arranged to follow the arc 16 which is struck from the center of the pivot 13. Bordering the free longitudinal edge of the marker are a series of areas 17 in each of which a day of the week is noted and each of these areas is disposed to coincide with a memorandum area 6 of the adjacent or underlying leaf.

The opposite face of the marker card is similarly marked off, as indicated at 18 in Figure 3.

Arranged in an arcuate group is the series of apertures 19, each being adjacent the arcuate line 16 and of a size to be covered by the indicating arrow 14. There is one of these apertures for each day of the week noted at the adjacent edge of the marker and, as shown in Figure 3, when the indicating arrow 14 is distinctively colored, preferably red as illustrated, when the marker card 10 is turned over so that the back is exposed to view, it can be seen through one of the apertures 19 where the point of the arrow is located and thus indicate to the user which day of the week the arrow is designating.

In the use of the present memorandum calendar book, the marker card will be disposed at the beginning of each week over the particular page of the book on which the dates of the day of the week are shown. The width of the marker card 10 is such that the free longitudinal edge will lie inwardly of the date carrying marginal area of the narrowest of the leaves 5. Thus, if the day to be indicated is Thursday, May 5th, the arrow 14 will be disposed, as illustrated in Figure 1, and thus the user of the book will be prevented from making a mistake with regard to the day of the week or the time of the month as the arrow will indicate the month period upon the nearest underlying leaf and the day of the week will be shown in the same area designated by the arrow either at the outer edge of the bottom leaf 8 or if the outer edge of this leaf is not marked for the days of the week, this information will be given at the edge of the marker as shown.

It is contemplated to make the book without the names of the days of the week printed in the outer marginal portion of the last page or leaf 8 of each group so that the book will thus become a perpetually dated calendar in which the name of the day of any date therein can, in any year, be identified through the use of the marker card 10 upon which the days of the week are printed in the proper order to conform to the dates on the sheet, as shown and previously described.

Even if the book is not made up as a perpetually dated calendar, the book mark may be used with the book as it keeps the place of the current week, making it easy for the user to turn back to the current week after referring to future dates. If placed in the proper position, each day the indicating arrow will remind the user instantly what the current day is and when the marker is turned over so that the rear side will be exposed to view, the indicating arrow can still be seen through the aperture 19 which it may be covering.

In the making up of these units or groups of leaves which together make up the book, when the first day of a thirty-one day month falls on a Saturday or Sunday, as May does in the group illustrated, an extra sheet might be provided to accommodate the first day or two, or space could be provided for on the back of the last sheet of the previous month where the month and day would be indicated, as designated by the numeral 20. It would also be possible to print the first of a month directly after the last day of the previous month on the last leaf 8 of the group so that there would be no blank spaces on this last leaf as there are in the leaf 8 of Figure 1, in which case proper identification would, of course, be printed across the top to correspond with the dates contained in the particular group of leaves, such as, December 27, 1937, to January 30, 1938.

Figure 4 illustrates in plan a calendar pad which may be of the type adapted to be hung on a wall or supported upon a suitable stand on a desk and in association with this pad there is illustrated a day indicator or marker which is generally designated by the numeral 21. This marker is of the same type as that shown in Figure 1, with the exception of the fact that the longitudinal edge is not provided with areas for the insertion of the names of the days of the week, otherwise it consists of the cardboard body portion 22 and the pointer 23 pivotally attached thereto, as at 24, and movable at its free end along the arc 25 from which radiate the areas 26 which are ruled on the face of the card.

The numeral 27 designates the back of the calendar and secured between this back and the indicator card 21 are the group of pages or sheets 28, each of which has a longitudinal edge bordering area which is transversely divided or ruled off to form the squares 29 in each of which a day of the current month is printed. At the top of each of the areas 29 the name of the month is printed and the sheets 28 terminate short of the lower edge of the back 27 so as to provide an exposed marginal area 30 which has seven divisions, each of which receives a name of a day of the week and corresponds with an area 29 upon the exposed top 1 of the sheets 28. It will thus be seen that each of the sheets 28 has printed thereon the dates of one week of a month so that at the end of each week, one of these sheets must be removed so that the next or subsequent week may be shown. The particular day of the week is found by correlating the date number with the adjacent or underlying area 30 formed upon the back 27 and a ready visual indication is obtained by shifting the indicating arrow 23 upon the card 22 to the marked off area 26 which, at one end, is directed toward the current day of the week.

Figure 6 generally illustrates a modified form of the structure illustrated in Figure 1. In this form, the book, one-half of which is shown and which is designated by the numeral 31, is provided with a series of leaves which are all of the same width, the uppermost leaf being indicated by the numeral 32 and the place marker and date indicator, which is indicated generally by the numeral 33, is only of slightly less width than the sheet 32 so that the sheet lying thereunder will have the marginal exposed border portion 34 which is divided into seven areas, each of which lies beside a memorandum area which is covered by the indicator 33 and each of the border areas has printed therein the name of the current month, the day of the same, and the day of the week corresponding to the month date. This indicator 33 has the pointer 35 with the free end arranged to follow the arcuately arranged series of ruled areas 36 each of which at the end adjacent the free marginal edge of the marker card, leads to a dated border area of the underlying book leaf, so that the pointer 35 may be arranged to designate the current day and thus give a visual indication immediately upon opening the book, of the correct day of the week.

I claim:—

1. A combined memorandum and calendar book, comprising a plurality of groups of leaves, each group comprising a back leaf and a series of auxiliary leaves, the auxiliary leaves being of the same overall length but of progressively increasing width whereby each will have an exposed marginal area for the insertion of a day of the month notation, and the back leaf being of a width throughout its length greater than the widest auxiliary leaf to provide an exposed marginal portion along the entire length of the auxiliary leaves and of an overall length greater than the group of auxiliary leaves to provide a top exposed portion of as great a width as the auxiliary leaves, said auxiliary and back leaves having coinciding transversely ruled lines coacting to define related memorandum areas.

2. A combined memorandum and calendar book, comprising a plurality of groups of leaves, each group comprising a back leaf and a series of auxiliary leaves, the auxiliary leaves being of the same overall length but of progressively increasing width whereby each will have an exposed marginal area for the insertion of a day of the month notation, and the back leaf being of a width throughout its height greater than the widest auxiliary leaf to provide an exposed marginal portion along the entire length of the auxiliary leaves and of an overall length greater than the group of auxiliary leaves to provide a top exposed portion, said auxiliary and back leaves having coinciding transversely ruled lines coacting to define related memorandum areas, said exposed marginal portion of the back leaf having the days of one week indicated in longitudinal order thereon in said areas, each day notation being disposed at the outer side of and associated with all of the leaf memorandum areas lying to one side thereof, and a place marker having a shiftable indicator for designating a particular memorandum area and the day of the week associated therewith and lying in the associate area of the back leaf.

3. A combined memorandum and calendar book, comprising a plurality of groups of leaves, each group comprising a back leaf and a series of auxiliary leaves, the auxiliary leaves being of the same overall length but of progressively increasing width whereby each will have an exposed marginal area for the insertion of a day of the month notation, and the back leaf being of a width throughout its height greater than the widest auxiliary leaf to provide an exposed marginal portion and of an overall length greater than the group of auxiliary leaves to provide a top exposed portion, said auxiliary and back leaves each being transversely ruled to form a memorandum area, a place marker card adapted to be disposed between a pair of leaves and having an outer marginal area bearing day of the week notations each alined with a memorandum area of the adjacent leaf, and a shiftable pointer carried by the marker, the free end of which may be located to designate any one of the said day of the week notations.

4. A combined memorandum calendar book, comprising a series of groups of leaves, each group consisting of a back leaf and a series of auxiliary leaves, said auxiliary leaves being of the same overall length and of gradually decreasing width from the one nearest the back leaf to the one farthest therefrom to provide each auxiliary leaf with an exposed marginal area, said back leaf being of greater width throughout its height than the adjacent auxiliary leaf and having exposed a marginal area of materially greater width than the exposed areas of the auxiliary leaves, said back leaf being of greater length than the auxiliary leaves to provide an exposed top marginal area, each of said auxiliary leaves and the back leaf being transversely ruled to provide a series of memorandum areas, the exposed marginal areas of the auxiliary leaves having day of the month notations therein each corresponding with a memorandum area, and said back leaf having in the exposed marginal area thereof day of the week notations each corresponding with a memorandum area.

5. As an article of manufacture, a memorandum book marker comprising a card having apertures at one longitudinal edge for engagement of a memorandum book leaf retaining rings, said card having indicia extending along the other longitudinal edge to indicate the days of a week, and a pointer pivotally attached to the card adjacent the first mentioned longitudinal edge for use in designating a selected day of the week indication on the card, said pointer being distinctively marked, and said card having an arcuately arranged series of apertures concentric with the pivotal center of the pointer and corresponding in number with the day of the week indications on the card, whereby the location of the pointer may be seen when the card is turned into a position to cover the pointer, the side of the card opposite from the pointer having corresponding day of the week indications thereon.

6. The combination with a sheet having a marginal area ruled to divide the same into a series of date containing spaces corresponding to the days of a week, of an indicator consisting of a card overlying said sheet and having a marginal edge disposed at the side of said ruled area inwardly of the free edge of the sheet along which said area lies, a pointer pivotally attached to the card and adapted to be swung to a selected position to indicate a selected day of the week space of said area, and a back for said sheet comprising a card having a marginal area exposed beside the date containing divided marginal area of the sheet and carrying the names of the days of a week, each arranged to correspond with a date appearing on the exposed marginal area of the sheet.

7. An article as described comprising a back sheet, a series of sheets secured to the back sheet and inset from an edge thereof whereby the back sheet will have an exposed border area, said border area having indicia printed in and longitudinally thereof, an indicator comprising a card secured over the top of said group of sheets and having one edge inset from the edges of the group of sheets lying along the border of the back sheet whereby the top sheet of said group will have an exposed border area, the said border area of said top sheet bearing indicia for use in association with indicia appearing in the border area of the back sheet, and a pointer pivotally attached to said indicator card and having its free end directed toward and adjacent that edge of the card bordering the exposed area of the underlying one of the group of sheets.

CLARENCE H. MANZLER.